US008070565B2

(12) United States Patent
Horst et al.

(10) Patent No.: US 8,070,565 B2
(45) Date of Patent: Dec. 6, 2011

(54) MICROWAVE POULTRY PROCESSING DEVICE AND METHOD

(76) Inventors: Drew Horst, Lampe, MO (US); Edgar Garcia-Rill, Little Rock, AR (US)

( * ) Notice: Subject to any disclaimer, the term of this patent is extended or adjusted under 35 U.S.C. 154(b) by 0 days.

(21) Appl. No.: 13/010,504

(22) Filed: Jan. 20, 2011

(65) Prior Publication Data

US 2011/0111680 A1    May 12, 2011

Related U.S. Application Data

(62) Division of application No. 11/981,230, filed on Oct. 31, 2007, now abandoned.

(51) Int. Cl.
*A22B 3/06* (2006.01)

(52) U.S. Cl. .................................................. 452/86

(58) Field of Classification Search ............... 452/57–60
See application file for complete search history.

(56) References Cited

U.S. PATENT DOCUMENTS

| 1,599,134 | A | * | 9/1926 | King ............................... 452/54 |
| 4,153,971 | A | * | 5/1979 | Simonds ......................... 452/59 |
| 4,875,253 | A | * | 10/1989 | Lambooy ........................ 452/58 |
| 4,953,263 | A | * | 9/1990 | Lambooy ........................ 452/58 |
| 5,888,132 | A | * | 3/1999 | Burnett .......................... 452/141 |
| 5,899,802 | A | * | 5/1999 | Burnett .......................... 452/141 |
| 6,338,673 | B2 | * | 1/2002 | Berry et al. .................... 452/58 |
| 6,471,576 | B1 | * | 10/2002 | Ross ............................... 452/58 |
| 7,241,212 | B2 | * | 7/2007 | Horst et al. ..................... 452/58 |
| 7,244,172 | B2 | * | 7/2007 | Horst et al. ..................... 452/58 |
| 7,588,486 | B2 | * | 9/2009 | Horst et al. ..................... 452/58 |

* cited by examiner

*Primary Examiner* — Richard Price, Jr.
(74) *Attorney, Agent, or Firm* — Lathrop & Gage LLP

(57) ABSTRACT

The invention relates to a method for loosening the feathers of a fowl prior to killing and processing, by exposing the fowl to a radio frequency source producing a frequency from between approximately 5 GHz and approximately 40 GHz, with an average surface power density between approximately 10 mW per square centimeter and approximately 100 mW per square centimeter, for a predetermined period of time. The invention also relates to a method for killing bacteria on the fowl prior to killing and processing.

20 Claims, 3 Drawing Sheets

MICROWAVE POULTRY PROCESSING DEVICE AND METHOD

CROSS-REFERENCE TO RELATED APPLICATIONS

This is a divisional application which claims priority of U.S. Non-provisional patent application Ser. No. 11/981,230 filed on Oct. 31, 2007 now abandoned, which application is incorporated herein by reference.

FIELD OF THE INVENTION

The device and method disclosed herein relates generally to poultry processing, and in particular to a device and method utilizing radio frequencies, specifically microwaves, for killing bacteria on poultry during the processing of the poultry. The disclosed device and method also may be used to aid in removing feathers from poultry by loosening the feathers within the follicle prior to another processing step for removing the feathers.

BACKGROUND OF THE INVENTION

The control of bacterial contamination is an important issue during the processing of poultry for human consumption. Cross-contamination of bacteria from one bird to another may be exacerbated by the mass processing of poultry and the use of automated production equipment. Operations such as chilling poultry carcasses in a chiller bath provide avenues for cross contamination through the use of a tank of chilled water that is reused to chill many poultry carcasses. Feather removal processing steps may also introduce bacteria onto the poultry from fecal matter originating in the poultry carcass' lower intestine. Secondary contamination sources, such as manual processing steps, may also create risks of bacteria contamination of poultry from handlers.

Current methods of removing bacteria from chickens may utilize chemical treatments to kill the bacteria. For example, the water in chiller baths used to lower the temperature of poultry during processing, may also be treated with chlorine, sodium hypochlorite or other chemical treatments known in the art to kill the bacteria. Multiple washing steps may also be used to reduce bacterial contamination during processing by washing the poultry carcasses after each processing step.

An example of control techniques for bacterial contamination, U.S. Pat. No. 6,547,659 to Adachi et al., describes the use of multiple rinsing steps during processing, and a sterilizing step where poultry carcasses are sterilized during chilling in the chilled bath. Sterilization in the chiller bath may include chlorine solutions, or other chemical solutions added to the bath to kill any bacteria present.

It is recognized that killing or preventing bacterial contamination at an early stage of processing is preferred. The current methods of decontaminating the poultry carcasses are insufficient in that they are usually dependent on water-bourne chemicals or simple washing to remove bacteria. Such washing or chemical bath methods are undesirable because the wash solution may become contaminated with bacteria when used to process multiple poultry carcasses, and thus may exacerbate the problem the methods were designed to resolve. These washing steps also occur later in the processing process, after processing has opened the bird and exposed the meat of the poultry to the bacterial contamination.

The poultry processing device and method described in this application provide for decontamination from bacteria at a very early stage in the processing, before the poultry has been killed or cut open in any way. Further, the microwaves used to decontaminate the poultry may reach all areas of the carcass without the limitations of a water-borne treatment, which may not effectively contact all areas of the carcass. The poultry processing device described herein is non-invasive and can be utilized on live poultry without causing pain or damage to the animal.

The removal of feathers from poultry is also an important part of poultry processing. Various methods for loosening the feathers prior to plucking have been developed, to provide for more complete feather removal. One known method to loosen feathers is to submerge the poultry carcass in hot water to scald the poultry carcass, thereby causing the feather follicles in the skin of the carcass to dilate or open, thus loosening the feathers in the follicles. This method has a number of disadvantages, such as poor feather removal unless scald bath temperature is uniform, discoloration of the carcass if the temperature of the scald bath is too high, and contamination of internal organs with water if the poultry is still alive. The inventive device and method disclosed herein loosens feather quills from the associated follicle by degrading the protein strand which secures the feather in the follicle. Once the quill is loosened in the follicle, feathers may be dislodged by force, such as hand or machine plucking, or with jets of compressed air.

The processing device and method described herein provide for the loosening of feathers by exposure of the chicken carcass to radio frequency electromagnetic radiation, without the problems caused by the existing methods of loosening feathers.

BRIEF DESCRIPTION OF THE DRAWING

The invention is illustrated using the following figures along with the detailed description of the invention.

DETAILED DESCRIPTION OF THE INVENTION

The microwave poultry processing device and method described herein relates to a new device and method for reducing and killing bacteria in poultry during processing. The device further relates to an improved method and process for removing feathers from poultry carcasses.

Figure 1:
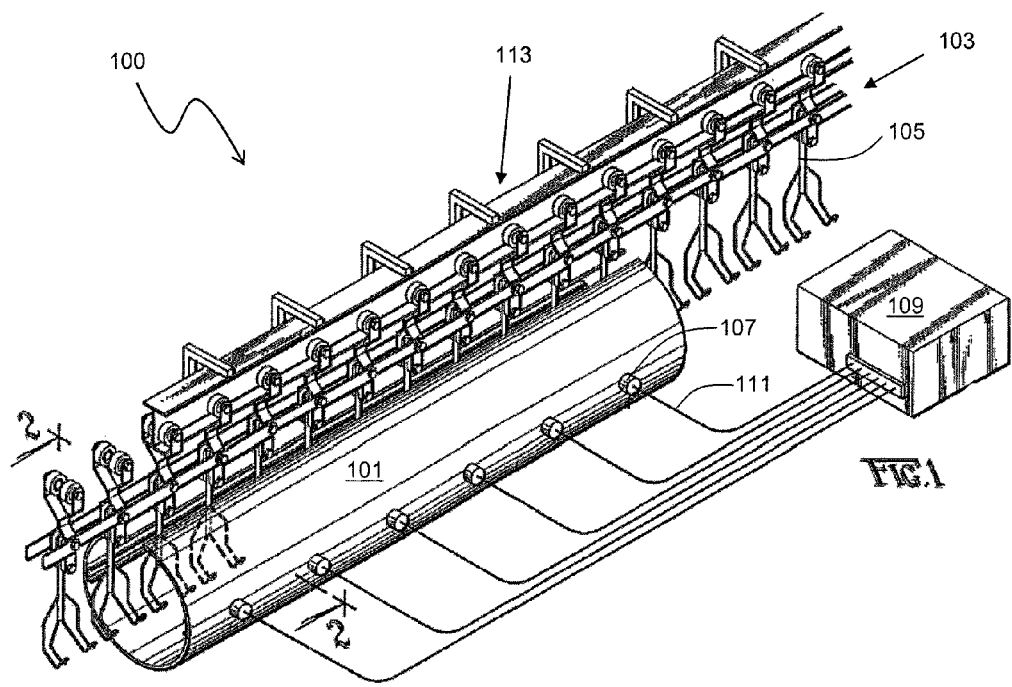
FIG. 1 is a perspective view of an embodiment of the inventive device.

Referring generally now to FIG. 1, an embodiment of the poultry processing device 100 is presented. In this particular embodiment, microwave radio frequency signals are transmitted along field guiding structures, e.g. structure 101, which limit the signal transmission range. Exposure of the bacteria present on and within the flesh of the poultry to specific radio frequencies over a period of time will effectively kill a significant amount of the bacteria. In at least one embodiment, the field guiding structure 101 is a metallic cylinder or tube. The tube may be either fully or partially closed. In yet another embodiment, the field guiding structure 101 includes a plurality of parallel guiding plates (not shown). In at least one embodiment, field guiding structure 101 is constructed from a highly conductive metal. It may be necessary to curve the sides of field guiding structure 101, dependent upon the parameters of the power generation, exposure time, and the like discussed below. In one embodiment, field guiding structure 101 is either coated with an easily cleaned surface or provided with a shield that can be removed for cleaning.

Figure 2:
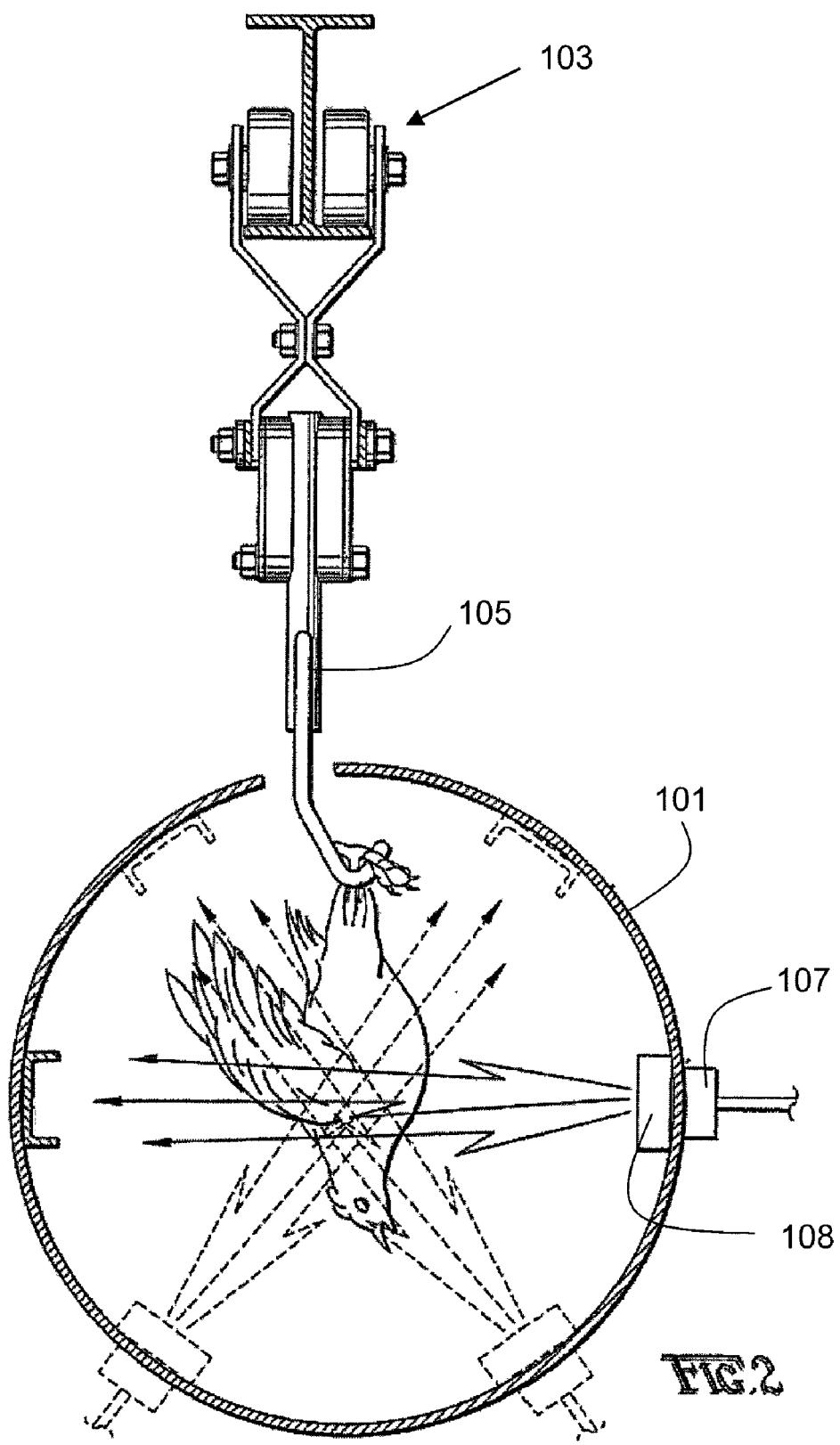
FIG. 2 is a cross sectional view of an embodiment of the inventive device taken along line 2-2 of FIG. 1.

Integrated with the field guiding structure 101 is a shackle line 103. In particular, shackle line 103 is positioned such that movement along shackle line 103 transports shackled poultry through field guiding structure 101 at a predetermined rate. Cross-referencing for a moment FIG. 1 with FIG. 2, animals (poultry) are suspended upside down by any of a number of retaining or shackling devices 105 well known in the art, and are conveyed along shackle line 103 with their bodies passing through field guiding structure 101.

A radio frequency coupling trough 107, through which RF (radio frequency) signals can be coupled into field guiding structure 101, may use antennas, apertures, probes, wires, or other methods commonly practiced in the art of microwave RF design for concentrating an RF signal or RF field, and reducing power requirements. A plurality of troughs 107 are positioned longitudinally along the length of field guiding structure 101, as shown in FIG. 1. In at least one embodiment, troughs 107 are mounted through apertures in one or more parallel guiding plates. These troughs 107 are connected to a source 109 of the RF signals through guiding structures that are known as waveguides, of which waveguide 111 is exemplary. In yet another embodiment, other well known structures available for guiding electromagnetic waves at the frequencies described below may be used. It may be beneficial to place a cylindrical resonator (not shown) within the field guiding structure 101 prior to passing a radio frequency along structure 101, to decrease the required operational power. Further, a single radio frequency transmitter 108 (FIG. 2) may be used in conjunction with a microwave power splitter (not shown) to convey power through a given trough 107. An overhead conveying system 113, which includes shackle line 103, is grounded to field guiding structure 101 to prevent electrical arcing which would result in undesired heating of the conveying system 113.

The RF power may be supplied by a klystron, magnetron, or similar device (not shown) consistent with the peak power rating, pulse repetition frequency, duty cycle and RF frequency required by incapacitator 100. A frequency range of from between 5 (gigahertz) GHz to 40 GHz can operatively kill bacteria on the fowl and loosen the feathers of the fowl, depending on power density. In at least one embodiment, the RF frequency is approximately 16 GHz, which is typical of Ku band microwave applications. The peak power rating is in the range of 10 kilowatts (kW) to 100 kW. In one embodiment, the optimum peak power rating is 60 kW, with an average power in the range of 20 W to 200 W, preferably 100 W. It is understood that power ratings may differ depending on the usable configuration of the RF power supply. Typically, the pulse frequency will be approximately 8400 Hz (+/−) 2500 Hz, with a pulse duration of approximately 0.20 microseconds. This is commensurate with a duty cycle of approximately 0.2%.

Magnetron tubes consistent with the above specifications are commercially available and are manufactured, for example, by CPI Wireless Solutions of Beverly, Mass. An exposure energy density of between 150 milliwatts (mW) seconds per square centimeter and 350 mW seconds per square centimeter is sufficient to substantially reduce common bacteria present on the animals at a power density of 45 mW per square centimeter. The exposure time at this power level is in the range of 2 to 30 seconds, but will eradicate common bacteria from the animal carcass in approximately 2 to 10 seconds.

In one embodiment of the inventive method, the following parameters are specified: a radio frequency from between approximately 5 GHz and approximately 40 GHz, with an average power density from between approximately 10 mW per square centimeter and approximately 100 mW per square centimeter, produced and concentrated within and/or around a field guiding structure, such as field guiding structure 101. An animal's, e.g. poultry, complete body is then exposed to the radio frequency by placing the animal's body adjacent to or within field guiding structure 101 for a period of time from between approximately 3 seconds and approximately 30 seconds. In at least one embodiment, the radio frequency is produced from a magnetron operable within the Ku band. In a second embodiment, the body of the standing, shackled and/or conveyed animal is exposed from above or from the sides with similar effects. In those cases in which repeated exposure is desired, the waveguides, e.g. waveguide 111, can be split to provide RF at multiple points along field guiding structure 101, or multiple magnetrons can be used in series to provide RF exposure at multiple points along field guiding structure 101.

Figure 3:
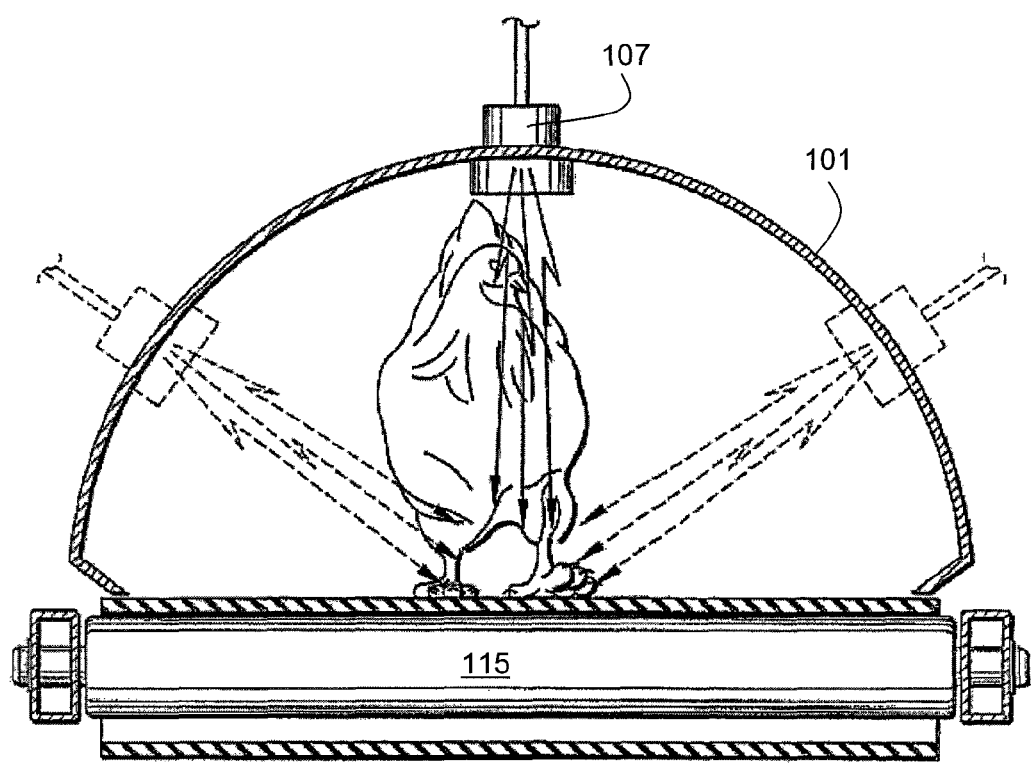
FIG. 3 is a cross sectional view of an embodiment of an alternative embodiment of the inventive device utilizing a roller belt assembly for conveyance of the poultry.

In another embodiment, as shown in FIG. 3, the same method or process of exposing the animal's body to RF is used while the animals are standing or resting on a surface, such as a conveyor 115, with the RF signals transmitted generally downward towards the head or from the side towards the body and head. Conveyor 115 may be a roller belt assembly or other conveyor system well known in the art. The device described herein is also useful for aiding in removing the feathers of poultry during processing. There are two basic types of feather: vaned feathers which cover the exterior of the body, and down feathers which are underneath the vaned feathers. The pennaceous feathers are vaned feathers. Also called contour feathers, pennaceous feathers are distributed over the whole body. Some of them are modified into remiges, the flight feathers of the wing, and rectrices, the flight feathers of the tail. A typical vaned feather features a main shaft, called the rachis. Fused to the rachis are a series of branches, or barbs; the barbs themselves are also branched and form the barbules. These barbules have minute hooks called barbicels for cross-attachment. Down feathers are fluffy because they lack barbicels, so the barbules float free of each other, allowing the down to trap much air and provide excellent thermal insulation. At the base of the feather, the rachis expands to form the hollow tubular calamus, or quill, which inserts into a follicle in the bird's skin.

The device aids in the feather removal process by causing the follicles in the skin of the poultry to dilate or otherwise open, thus loosening the attachment between the feathers and the flesh. Further, one or more strands or protein connect the quill and the follicle. Exposure of the carcass to RF, as described herein, causes the protein strand(s) to degrade. Sufficient RF exposure will actually liquify the protein which allows the feather to easily be removed from the follicle. Once the feathers have been loosened in the follicles, some may become disconnected from the poultry. However, most feathers will remain loosely attached to the carcass. To complete the depilation process, the carcass is processed according to any of the well-known methods of removing feathers such as by hand, by machine plucking, by exposure to jets of compressed air, or by suctioning, among others.

Methods of removing feathers known in the art will be less efficient and take more time to remove the same amount of feathers from a carcass than that which has been processed according to the invention described herein. The quality of the poultry carcass will be improved, as a higher percentage of feathers will be removed with less labor. The improved feather-removing process will make the complete carcass processing method more efficient, less wasteful, and increase the quality of the final product. Further, this method saves substantial money. Feathers removed from carcasses are used for any number of purposes, from bedding and clothing to animal food additives, insulation or other durable consumer goods. Currently, feathers removed during the slaughter process are typically wet from the traditional scalding method. The wet feathers are heavy and difficult to move. Further, wet feathers have a foul odor and may become mildewed or moldy if not dried in a reasonable amount of time. The instant method allows dry feathers to be transported and processed, saving in transportation and processing costs.

The inventive process utilizes an exposure energy density of between 150 milliwatts (mW) seconds per square centimeter and 350 mW seconds per square centimeter is sufficient to substantially loosen the feathers present on the poultry carcass at a power density of 45 mW per square centimeter. The exposure time at this power level is in the range of 2 to 30 seconds, but will loosen the feathers attached to the animal carcass in approximately 2 to 10 seconds.

It will be apparent to those skilled in the art that various modifications and variations can be made in the system and method of the present invention without departing from the spirit or scope of the invention. The present invention covers the modifications and variations of this invention provided they come within the scope of the appended claims and their equivalents.

What is claimed is:

1. A device for loosening the feathers of a fowl comprising:
   a radio frequency source capable of producing radio frequency radiation;
   a field guiding structure for maintaining a radiation field; and
   a transport device capable of transporting a fowl through the radiation field;
   wherein the field guiding structure is coupled to the radio frequency source for receiving radio frequency radiation there from.

2. The device of claim 1 wherein the field guiding structure is selected from the group consisting of a tube, a partial tube, a plurality of parallel plates, or a plurality of curved plates.

3. The device of claim 2 wherein the radio frequency source is coupled to the field guiding structure through at least one coupling point by at least one coupling device selected from the group consisting of a waveguide, an antenna, an aperture, a transmitter, or a power splitter.

4. The device of claim 3 wherein the transport device is selected from the group consisting of a shackle line or a conveyor belt.

5. The device of claim 4 wherein the radio frequency source produces a radio frequency between 5 GHz and 40 GHz with a peak power rating between 10 kW and 100 kW.

6. The device of claim 5 wherein the surface power density at the field guiding structure is between 10 mW per square centimeter and 100 mW per square centimeter.

7. The device of claim 6 wherein the radio frequency source produces pulses of radiation with a frequency between 5900 Hz and 10900 Hz and a pulse duration of 0.20 microseconds.

8. The device of claim 7 wherein the radio frequency source produces a radio frequency of 16 GHz with a peak power rating of 60 kW and an average power between 20 W and 200 W.

9. The device of claim 8 wherein a cylindrical resonator is disposed within the field guiding structure.

10. The device of claim 9 wherein the radio frequency source is selected from the group consisting of a klystron or a magnetron.

11. A method for removing the feathers from a fowl comprising the steps of:
    providing a radio frequency source for producing radio frequency radiation;
    providing a field guiding structure for maintaining a radiation field from the radiation produced by the radio frequency source;
    coupling the radio frequency source to the field guiding structure;
    providing a transport device for transporting the fowl through the radiation field maintained by the field guiding structure.

12. The method of claim 11 further comprising the steps of:
    energizing the radio frequency source to produce a radiation field in the field guiding structure;
    utilizing the transport device to transport a fowl through the radiation field to loosen the feathers of the fowl;
    mechanically removing the feathers from the fowl.

13. The method of claim 12 wherein the step of mechanically removing the feathers is achieved by a process selected from the group consisting of: pulling, plucking, blowing, or suctioning the feathers from the fowl.

14. The method of claim 13 wherein the field guiding structure is selected from the group consisting of a tube, a partial tube, a plurality of parallel plates, or a plurality of curved plates.

15. The method of claim 14 wherein the radio frequency source is coupled to the field guiding structure through at least one coupling point by at least one coupling device selected from the group consisting of a waveguide, an antenna, an aperture, a transmitter, or a power splitter.

16. The method of claim 15 wherein the transport device is selected from the group consisting of a shackle line or a conveyor belt.

17. The method of claim 16 wherein the radio frequency source produces a radio frequency between 5 GHz and 40 GHz with a peak power rating between 10 kW and 100 kW.

18. The method of claim 17 wherein the surface power density at the field guiding structure is between 10 mW per square centimeter and 100 mW per square centimeter.

19. The method of claim 18 wherein the radio frequency source produces pulses of radiation with a frequency between 5900 Hz and 10900 Hz and a pulse duration of 0.20 microseconds.

20. The method of claim 17 wherein the radio frequency source produces a radio frequency of 16 GHz with a peak power rating of 60 kW and an average power between 20 W and 200 W.

* * * * *